United States Patent
Tussing

[11] Patent Number: 5,188,308
[45] Date of Patent: Feb. 23, 1993

[54] WIRE CART FOR OPTIONAL USE AS A CONDUIT CART

[76] Inventor: Norman P. Tussing, 1365 SE. 10th, Warrenton, Oreg. 97146

[21] Appl. No.: 775,427

[22] Filed: Oct. 15, 1991

[51] Int. Cl.⁵ .......................................... B65H 49/32
[52] U.S. Cl. ............................ 242/86.5 OR; 242/130; 242/131; 242/139
[58] Field of Search .............. 242/86.5 R, 129, 129.5, 242/130, 131, 131.1, 134, 139; 280/47.17, 47.19; 211/13, 60.1, 189, 206; 248/127, 158

[56] References Cited

U.S. PATENT DOCUMENTS

| | | | |
|---|---|---|---|
| 1,818,518 | 8/1931 | Young | 242/130 X |
| 2,705,114 | 3/1955 | Worsham | 242/86.5 R |
| 3,452,947 | 7/1969 | Thurman | 242/131 |
| 3,477,661 | 11/1969 | Emerson et al. | 242/131 |
| 4,538,776 | 9/1985 | Perry | 242/131 |
| 4,564,152 | 1/1986 | Herriage | 242/86.5 R |
| 4,611,645 | 9/1986 | Whisnant | 242/86.5 R X |

FOREIGN PATENT DOCUMENTS

WO89/08732  9/1989  PCT Int'l Appl. ................. 242/131
318343  9/1929  United Kingdom ............ 242/129.5

*Primary Examiner*—Stanley N. Gilreath
*Attorney, Agent, or Firm*—James D. Givnan, Jr.

[57] ABSTRACT

A cart for use by electricians is disclosed having a main longitudinal member supported at its ends by pairs of wheels with one pair being of the swivel type to facilitate passage through narrow doorway openings of a building. End mounted post assemblies on the longitudinal member are equipped with arms for the optional carrying of wire reels or electrical conduit. Detachable post assemblies are also carried by the longitudinal member. The post assemblies include sleeves through which may be inserted a spindle on which a large wire reel may be carried. The detachable post assemblies each include a base attachable to the longitudinal member. Removal of a fastener assembly permits partial disassembly of the cart to facilitate the removal or addition of the detachable post assemblies.

5 Claims, 1 Drawing Sheet

U.S. Patent
Feb. 23, 1993
5,188,308
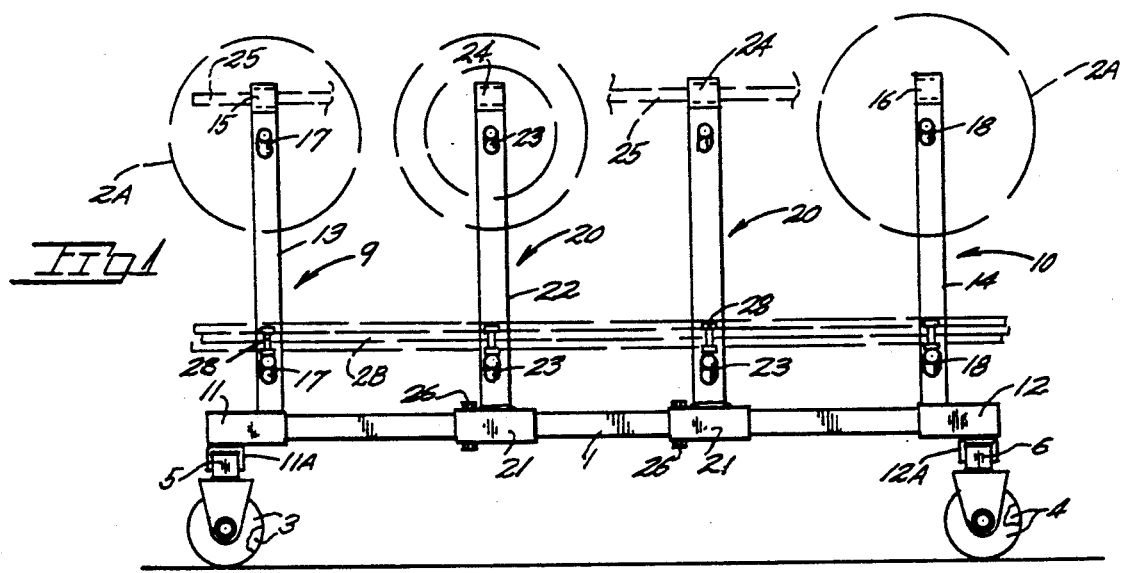
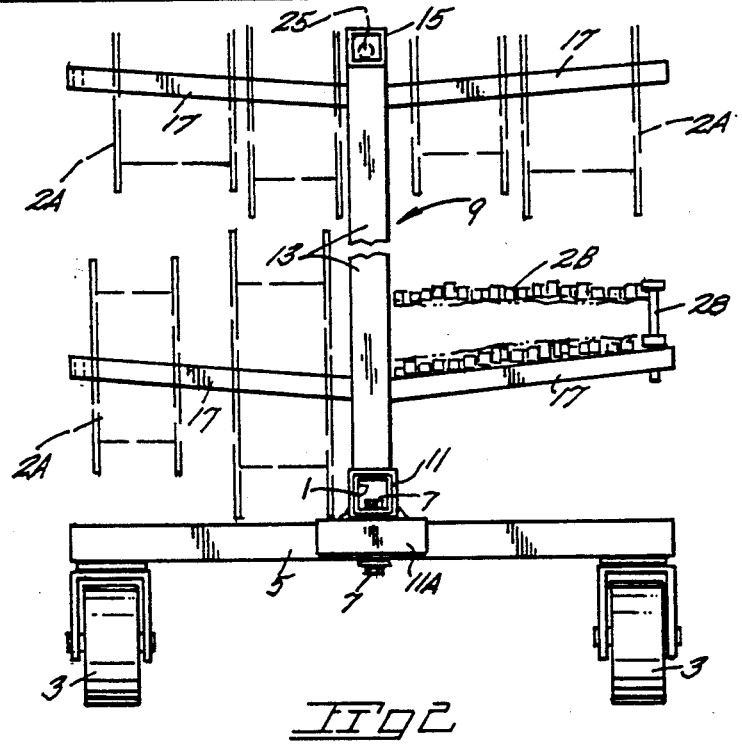
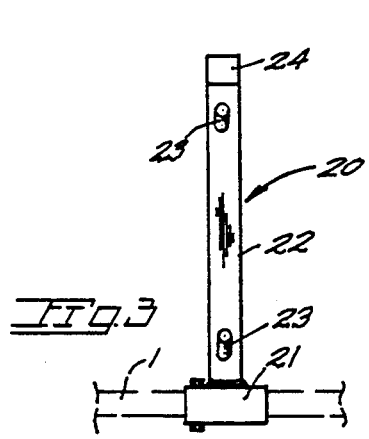
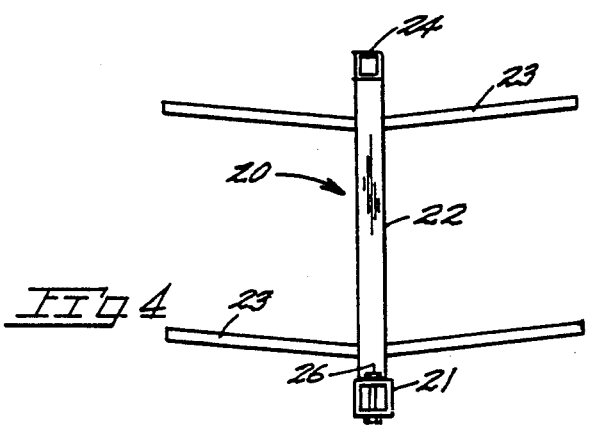

WIRE CART FOR OPTIONAL USE AS A CONDUIT CART

BACKGROUND OF THE INVENTION

The present invention pertains generally to carts used by electricians for transporting wire reels between job sites in a building.

Electricians typically use a wire cart during the wiring of a commercial building to carry reels of wire enabling convenient access to various wire sizes during a job. Wire carts may include multiple arms on which are carried a number of wire reels in a manner permitting paying out of the wire from the arm supported reel. Other wire carts support wire reels in a horizontal position in place on upright posts. Known wire carts are not additionally suitable for transporting lengths of electrical conduit and accordingly the same must be transported on a general purpose cart or dolly.

A U.S. Pat. application Ser. No. 07/634,038, filed by the present inventor, discloses a wire cart having an upright post assembly on which may be carried several reels of wire with the cart being of knockdown construction.

SUMMARY OF THE PRESENT INVENTION

The present invention is embodied within a cart having both permanent and removably mounted post assemblies to adapt the cart to the carrying of both wire reels as well as electrical conduit.

The present cart includes an undercarriage on which is supported a longitudinal member having a pair of post assemblies adjacent at its ends. Both post assemblies are preferably detachably mounted to the longitudinal member for the purpose of permitting supplemental post assemblies to be added into place on the main longitudinal member to provide supplemental reel carrying capacity. Accordingly the wire reel capacity of the wire cart may be substantially increased for those wiring jobs requiring a wide variety of electrical wire sizes. The present cart may be readily reconfigured by removal or addition of supplemental post assemblies to best suit the job at hand. A substantial quantity of conduit may be carried by the cart. Removal of one or more supplemental post assemblies results in a substantial weight reduction of the cart.

The supplemental post assemblies are equipped with a base for installation on the longitudinal member of the cart. Locks fix the supplemental post assemblies in place. Additionally, stops may be installed on the arm ends of the cart to confine electrical conduit in place on the arms during travel. The stops are preferably of the pin type to facilitate removal and modification of the cart arms for receiving wire reels. In certain configurations, the present cart is capable of transporting a substantial quantity of both electrical conduit and a multitude of wire reels.

Important objectives include the provision of a wire cart capable of being configured by the user to carry a wide range of wire reels or electrical conduit or a combination thereof; the provision of a wire cart wherein supplemental post assemblies are detachably mounted on a longitudinal frame member of the cart; the provision of a wire cart capable of carrying a large number of wire reel of different sizes along with a quantity of lengths of electrical conduit.

BRIEF DESCRIPTION OF THE DRAWINGS

In the accompanying drawings:

FIG. 1 is a side elevational vie of the present cart;

FIG. 2 is an end elevational vie taken from the left side of FIG. 1;

FIG. 3 is a side elevational view of a detachable post assembly removed from the cart; and FIG. 4 is a front elevational view of the post assembly shown in FIG. 3.

DETAILED DESCRIPTION OF THE PREFERRED EMBODIMENTS

With continuing attention to the drawings wherein applied reference numerals indicate parts similarly hereinafter identified, the reference numeral 1 indicates generally a longitudinal frame member of the present cart for the transport of wire reels 2A and electrical conduit 2B.

An undercarriage for the cart includes a pair of caster wheels at 3 at one end of the cart while the remaining end of the cart is supported by a pair of non-caster or fixed wheels at 4. Preferably the caster wheels 3 are each of the type equipped with a foot actuated brake. Cross frame members 5 and 6 carry at their ends the pairs of caster wheels at 3 and 4. The cross frame members 5 and 6 are bolted by a fastener assembly as at 7 to longitudinal frame member 1.

Post assemblies indicated generally at 9 and 10 are carried at the extremities of longitudinal member 1 with each post assembly including a tubular segment 11 and 12 through which extends an end segment of frame member 1. Upright tubular posts at 13 and 14 are welded at their lower ends to tubular segments 11 and 12 while the upper end of each of said posts receives a sleeve 15 and 16. Vertically spaced on each of the posts are laterally projecting arms 17 and 18 for the reception of wire reels 2A and conduit 2B.

Inverted channels at 11A and 12A welded to tubular segments 11 and 12, receive the frame members 5 and 6 with a respective fastener assembly 7 extending through the tubular segments 11 and 12 and the inverted channels 11A–12A as well as the longitudinal frame member 1 and the cross members 5 and 6.

Detachable post assemblies generally at 20 are shown in FIG. 3 for installation on longitudinal member 1 when the job at hand requires added wire reel and/or conduit capacity. Each post assembly includes a base 21 of an internal section to permit engagement with longitudinal member 1 of the cart. A post 22 is equipped with arms 23 on which a multitude of wire reels may be carried. Post 22 is also provided with a sleeve at 24 which is in axial alignment with sleeves 15 and 16 of the end mounted post assemblies to receive along therewith, a spindle or bar at 25 on which may be transported wire reels of a diameter too large for positioning on arms 17, 18 or 23 of the permanent post assemblies. For securement of the detachable post assemblies to longitudinal member 1 the latter is apertured to receive a fastener 26. Similarly base 21 on each of the detachable post assemblies is provided with openings which permit the insertion of fastener 26 for base attachment. The base 21 of each detachable post assembly is preferably of tubular construction for slidable engagement with longitudinal member 1. For the addition or removal of a detachable post assembly 20, the removal of a single fastener assembly 7 permits temporary removal of an end mounted post assembly 9 or 10.

For carrying electrical conduit the arms of the post assemblies are equipped with arm inserted stops at 28 which are removable to enable wire reel placement on an arm.

While I have shown but a few embodiments of the invention, it will be apparent to those skilled in the art that the invention may be embodied still otherwise without departing from the spirit and scope of the invention.

Having thus described the invention, what is desired to be secured by a Letters Patent is:

I claim:

1. A cart for use by electricians for transporting wire reels and electrical conduit at a job site, said cart comprising, an undercarriage including pairs of wheels, a longitudinal member supported by said undercarriage, multiple post assemblies one each on the ends of said longitudinal member each including a tubular member in place on said longitudinal member, a post secured at its lower end to said tubular member, a sleeve at the upper end of said post to receive a spindle on which a wire reel may be carried and arms on said post, and a detachable post assembly for optional use located intermediate said post assemblies at each end of said longitudinal member and including a supplemental post, a base at the post lower end for disposition on the longitudinal member in a manner spaced from said post assemblies at each end of said longitudinal member, detachable fastener means engageable with said base and said longitudinal member for attaching said detachable post assembly to said longitudinal member, and arms on the supplemental post.

2. The cart claimed in claim 1 wherein said arms on said multiple post assemblies include stops removably mounted on said arms to confine electrical conduit thereon.

3. The cart claimed in claim 1 wherein said base of the detachable post assembly is of tubular configuration.

4. The cart claimed in claim 3 wherein at least one of said multiple post assemblies at each end of said longitudinal member includes a fastener assembly for removable securement of said one of said multiple post assemblies to said longitudinal member.

5. The cart claimed in claim 1 wherein said detachable post assembly includes a sleeve located at the upper end of said post to receive a spindle on which a wire reel may be carried.

* * * * *